US011197204B2

(12) United States Patent
Faus Gregori et al.

(10) Patent No.: US 11,197,204 B2
(45) Date of Patent: Dec. 7, 2021

(54) VOICE SERVICE HANDOVER (71) Applicant: British Telecommunications Public Limited Company, London (GB)

(72) Inventors: Francisco Faus Gregori, London (GB); Alistair Gomez, London (GB)

(73) Assignee: British Telecommunications Public Limited Company, London (GB)

(*) Notice: Subject to any disclaimer, the term of this patent is extended or adjusted under 35 U.S.C. 154(b) by 130 days.

(21) Appl. No.: 16/624,410

(22) PCT Filed: Jun. 6, 2018

(86) PCT No.: PCT/EP2018/064879
§ 371 (c)(1),
(2) Date: Dec. 19, 2019

(87) PCT Pub. No.: WO2018/234038
PCT Pub. Date: Dec. 27, 2018

(65) Prior Publication Data
US 2020/0128449 A1 Apr. 23, 2020

(30) Foreign Application Priority Data
Jun. 23, 2017 (EP) ...................................... 17177599

(51) Int. Cl.
*H04W 36/00* (2009.01)
*H04W 36/30* (2009.01)
(Continued)

(52) U.S. Cl.
CPC ..... *H04W 36/0022* (2013.01); *H04W 36/005* (2013.01); *H04W 36/0016* (2013.01);
(Continued)

(58) Field of Classification Search
CPC ........... H04W 36/0022; H04W 36/305; H04W 36/0016; H04W 36/005; H04W 36/14;
(Continued)

(56) References Cited

U.S. PATENT DOCUMENTS 8,805,374 B2   8/2014  Zhu et al.
9,420,510 B1   8/2016  Surmay et al.
(Continued)

FOREIGN PATENT DOCUMENTS

CN   101019451 A   8/2007
CN   101297578 A   10/2008
(Continued)

OTHER PUBLICATIONS

Chagh, Youssef, Zouhair Guennoun, and Youness Jouihri. "Voice service in 5G network: Towards an edge-computing enhancement of voice over Wi-Fi." 2016 39th International Conference on Telecommunications and Signal Processing (TSP). IEEE, 2016. (Year: 2016).*

(Continued)

*Primary Examiner* — Sharad Rampuria
(74) *Attorney, Agent, or Firm* — Patterson Thuente Pedersen, P.A.

(57) ABSTRACT

A user entity (UE) such as a smartphone is configured to connect to both Wi-Fi and a Long Term Evolution (LTE) cellular network for voice and data services. For voice, the UE supports both Voice over LTE (VoLTE) and Voice over Wi-Fi (VoWiFi). When the UE is connected to VoWiFi and roaming from a first Wi-Fi access point to a second Wi-Fi access point, the UE and Mobility Management Entity in the cellular network carry out a preparatory handover to VoLTE to prevent service loss in the event of an unsuccessful VoWiFi connection from the second Wi-Fi access point.

15 Claims, 7 Drawing Sheets

(51) Int. Cl.
  *H04W 36/14* (2009.01)
  *H04W 84/12* (2009.01)
  *H04W 88/10* (2009.01)
  *H04M 7/00* (2006.01)

(52) U.S. Cl.
  CPC ......... *H04W 36/14* (2013.01); *H04W 36/305* (2018.08); *H04W 84/12* (2013.01); *H04W 88/10* (2013.01); *H04M 7/006* (2013.01)

(58) Field of Classification Search
  CPC ..... H04W 84/12; H04W 88/10; H04W 72/04; H04W 72/12; H04W 76/00; H04W 36/026; H04W 60/00; H04W 36/0005; H04M 7/006; H04B 7/2123; H04B 7/2121; H04J 2203/0069; H04Q 2213/394
  See application file for complete search history.

(56) References Cited

U.S. PATENT DOCUMENTS

| | | | |
|---|---|---|---|
| 9,883,436 B2 | 1/2018 | Brown et al. | |
| 10,015,686 B2 | 7/2018 | Townend et al. | |
| 10,123,241 B2 | 11/2018 | Brown et al. | |
| 10,142,919 B2 | 11/2018 | Brown et al. | |
| 10,231,177 B2 | 3/2019 | Ringland et al. | |
| 10,356,706 B2 | 7/2019 | Ringland et al. | |
| 2001/0055285 A1 | 12/2001 | Tomoike | |
| 2003/0134638 A1 | 7/2003 | Sundar et al. | |
| 2005/0003857 A1 | 1/2005 | Sylvain | |
| 2005/0059400 A1 | 3/2005 | Jagadeesan et al. | |
| 2005/0090259 A1 | 4/2005 | Jain et al. | |
| 2005/0271021 A1 | 12/2005 | Alemany et al. | |
| 2006/0046728 A1 | 3/2006 | Jung et al. | |
| 2006/0092883 A1 | 5/2006 | Lee et al. | |
| 2006/0217147 A1 | 9/2006 | Olvera-Hernandez et al. | |
| 2006/0240828 A1 | 10/2006 | Jain et al. | |
| 2007/0008928 A1 | 1/2007 | Kezys | |
| 2009/0010222 A1 | 1/2009 | Jechoux | |
| 2009/0286534 A1 | 1/2009 | Garg et al. | |
| 2009/0046655 A1 | 2/2009 | Zhao et al. | |
| 2009/0116443 A1 | 5/2009 | Walker et al. | |
| 2009/0215438 A1 | 8/2009 | Mittal et al. | |
| 2010/0003921 A1 | 1/2010 | Godlewski et al. | |
| 2010/0304738 A1 | 12/2010 | Lim | |
| 2011/0002466 A1 | 1/2011 | Kwak et al. | |
| 2012/0069754 A1 | 3/2012 | Marsh et al. | |
| 2012/0170548 A1 | 7/2012 | Rajagopalan et al. | |
| 2012/0269182 A1 | 10/2012 | Walker | |
| 2012/0315905 A1 | 12/2012 | Zhu et al. | |
| 2012/0324100 A1 | 12/2012 | Tomici et al. | |
| 2013/0003703 A1 | 1/2013 | Todd et al. | |
| 2013/0121145 A1 | 5/2013 | Draznin et al. | |
| 2013/0324125 A1 | 12/2013 | Bachman | |
| 2014/0118462 A1 | 5/2014 | Zhao et al. | |
| 2014/0177600 A1 | 6/2014 | Tsai et al. | |
| 2014/0313888 A1 | 10/2014 | Linkola et al. | |
| 2015/0117209 A1 | 4/2015 | Lee et al. | |
| 2015/0189556 A1 | 7/2015 | Sidhu et al. | |
| 2015/0201363 A1 | 7/2015 | Lundqvist et al. | |
| 2015/0215832 A1 | 7/2015 | Fitzpatrick | |
| 2015/0282013 A1* | 10/2015 | Kim | H04W 36/0022 370/331 |
| 2015/0312857 A1 | 10/2015 | Kim et al. | |
| 2016/0073286 A1 | 3/2016 | Wang et al. | |
| 2016/0095050 A1 | 3/2016 | Lindheimer et al. | |
| 2016/0157239 A1 | 6/2016 | Kalderen et al. | |
| 2016/0165508 A1 | 6/2016 | Jin | |
| 2016/0165518 A1 | 6/2016 | Keller et al. | |
| 2016/0165532 A1 | 6/2016 | Nagasaka et al. | |
| 2016/0174110 A1 | 6/2016 | Sharma et al. | |
| 2016/0192267 A1 | 6/2016 | Zhang et al. | |
| 2016/0295385 A1 | 10/2016 | Wang et al. | |
| 2016/0316425 A1 | 10/2016 | Cili et al. | |
| 2016/0345256 A1 | 11/2016 | Niranjan et al. | |
| 2016/0347298 A1 | 12/2016 | Jung | |
| 2016/0373989 A1 | 12/2016 | Tinnakornsrisuphap et al. | |
| 2017/0111813 A1 | 4/2017 | Townend et al. | |
| 2017/0118091 A1 | 4/2017 | Townend et al. | |
| 2017/0134261 A1 | 5/2017 | Seo et al. | |
| 2017/0280503 A1 | 9/2017 | He et al. | |
| 2017/0347298 A1 | 11/2017 | Brown et al. | |
| 2017/0374597 A1 | 12/2017 | Ray et al. | |
| 2018/0034860 A1 | 2/2018 | Russell et al. | |
| 2018/0124630 A1 | 5/2018 | Ringland et al. | |
| 2018/0254979 A1 | 9/2018 | Scahill et al. | |
| 2019/0014519 A1 | 1/2019 | Brown et al. | |
| 2019/0069328 A1 | 2/2019 | Sharma | |
| 2019/0116540 A1 | 4/2019 | Faus Gregori | |
| 2019/0124559 A1 | 4/2019 | Brown et al. | |
| 2019/0230132 A1 | 7/2019 | Brown et al. | |
| 2020/0100085 A1 | 3/2020 | Buckley et al. | |

FOREIGN PATENT DOCUMENTS

| | | |
|---|---|---|
| CN | 101690329 A | 3/2010 |
| CN | 104684039 A | 6/2015 |
| CN | 105554855 A | 5/2016 |
| CN | 105874848 A | 8/2016 |
| CN | 105897462 A | 8/2016 |
| CN | 106165490 A | 11/2016 |
| CN | 106559848 A | 4/2017 |
| CN | 106604318 A | 4/2017 |
| CN | 106658622 A | 5/2017 |
| CN | 106804051 A | 6/2017 |
| EP | 2900016 A1 | 7/2015 |
| EP | 2925056 | 9/2015 |
| GB | 2542826 A | 4/2017 |
| WO | WO-2004102919 A1 | 11/2004 |
| WO | WO-2006138019 A2 | 12/2006 |
| WO | WO-2007076147 A2 | 7/2007 |
| WO | WO-2012145706 A1 | 10/2012 |
| WO | WO-2015147576 A1 | 10/2015 |
| WO | WO-2015150745 A1 | 10/2015 |
| WO | WO2016004968 | 1/2016 |
| WO | WO-2016156439 A1 | 10/2016 |
| WO | WO-2017114932 A1 | 7/2017 |
| WO | WO-2017167694 A1 | 10/2017 |
| WO | WO-2017167701 A1 | 10/2017 |
| WO | WO-2018002130 A1 | 1/2018 |
| WO | WO-2018178241 A1 | 10/2018 |
| WO | WO-2018178293 A1 | 10/2018 |
| WO | WO-2018178294 A1 | 10/2018 |
| WO | WO-2018234037 A1 | 12/2018 |
| WO | WO-2018234038 A1 | 12/2018 |

OTHER PUBLICATIONS

Ngongang, Serge Fabrice Mbianda, Navid Tadayon, and Georges Kaddoum. "Voice over Wi-Fi: feasibility analysis." 2016 Advances in Wireless and Optical Communications (RTUWO). IEEE, 2016. (Year: 2016).*

3 GPP TR 37.834 V0.4.0 (Aug. 2013), "3rd Generation Partnership Project; Technical Specification Group Radio Access Network; Study on WLAN/3GPP Radio Interworking," (Release 12), May 15, 2014, XP050816244, 14 pages.

3GPP TS 22.173 V7.3.0 (Mar. 2007) "3rd Generation Partnership Project (3GPP); Technical Specification Group Services and System Aspects; IP Multimedia Core Network Subsystem (IMS) Multimedia Telephony Service and supplementary services Stage 1; (Release 7)," 10 pages.

3GPP TS 23.402 V13.4.0 (Dec. 2015) "3rd Generation Partnership Project; Technical Specification Group Services and System Aspects; Architecture enhancements for non-3GPP accesses (Release 13)," 650 Route des Lucioles—Sophia Antipolis Valbonne, Dec. 2015, 298 pages.

Alcatel-Lucent, "Policy Based Terminal Triggered, ANDSF Decided Access Selection," 3GPP draft, S2-081355_ANDSF discussion, Mobile Competence Centre, Athens, Greece, vol. SA WG2, Feb. 8, 2008, 5 pages.

(56) References Cited

OTHER PUBLICATIONS

Alcatel-Lucent, "Policy Based Terminal Triggered, ANDSF Decided Access Selection," 3GPP draft, S2-081658_ANDSF discussion, 3rd Generation Partnership Project (3GPP), Mobile Competence Centre, 650, Route Des Lucioles, F-06921 Sophia Antipolis Cedex, France, vol. SA WG2, Athens, XP050263998, Feb. 16, 2008, 6 pages.
Application and File History for U.S. Appl. No. 16/311,826, filed Dec. 20, 2018, Inventor(s): Brown, et al., 296 pages.
Application and Filing Receipt for U.S. Appl. No. 16/065,906, filed Jun. 25, 2018, Inventor(s): Brown et al.
Application and Filing Receipt for U.S. Appl. No. 16/086,351, filed Sep. 19, 2018, Inventor(s): Brown et al.
Application and Filing Receipt for U.S. Appl. No. 16/087,827, filed Sep. 24, 2018, Inventor(s): Faus Gregori.
Combined Search and Examination Report under Sections 17 and 18(3) for Great Britain Application No. 1705248.1, dated Aug. 25, 2017, 6 pages.
Combined Search and Examination Report under Sections 17 and 18(3) for Great Britain Application No. GB1705257.2, dated Aug. 17, 2017, 2 pages.
Combined Search and Examination Report under Sections 17 and 18(3) for Great Britain Application No. GB1705262.2, dated Oct. 12, 2017, 4 pages.
Ericsson, "Wi-Fi calling—extending the reach of VoLTE to Wi-Fi," Jan. 30, 2015, XP055251865, retrieved on Dec. 26, 2018, 5 pages.
Eronen E., "RFC 4555—IKEv2 Mobility and Multihoming Protocol (MOBIKE)," Nokia, Network Working Group Request for Comments, 4555, Category, Standards Track, XP055299729, Jun. 2006, 34 pages.
European Search Report for Application No. 17177601.6, dated Nov. 17, 2017, 12 pages.
Examination Report for Great Britain Application No. 1710046.2, dated Sep. 26, 2019, 3 pages.
Extended European Search Report for Application No. 17164395.0, dated Sep. 22, 2017, 17 pages.
Huawei: "How solutions 1, 2 and 3 work without ANDSF," RAN WG2 #83bis, R2-133444, Ljubljana, Slovenia; Oct. 7-11, 2013, XP050719049, 5 pages.
U.S. Appl. No. 16/498,061, filed Sep. 26, 2019, Inventor(s): Ramirez et al.
U.S. Appl. No. 16/498,103, filed Sep. 26, 2019, Inventor(s): Ramirez et al.
U.S. Appl. No. 16/498,546, filed Sep. 27, 2019, Inventor(s): Ramirez et al.
International Preliminary Report on Patentability for Application No. PCT/EP2016/082894, dated Jul. 3, 2018, 9 pages.
International Preliminary Report on Patentability for Application No. PCT/EP2017/057204, dated Oct. 2, 2018, 6 pages.
International Preliminary Report on Patentability for Application No. PCT/EP2017/057225, dated Oct. 2, 2018, 10 pages.
International Preliminary Report on Patentability for Application No. PCT/EP2018/058085, dated Oct. 10, 2019, 17 pages.
International Preliminary Report on Patentability for Application No. PCT/EP2018/058199, dated Oct. 10, 2019, 16 pages.
International Preliminary Report on Patentability for Application No. PCT/EP2018/058202, dated Oct. 10, 2019, 9 pages.
International Preliminary Report on Patentability for Application. PCT/EP2018/064879, dated Jan. 2, 2020, 13 pages.
International Preliminary Report on Patentability for Application No. PCT/EP2018/064878, dated Jan. 2, 2020, 12 pages.
International Preliminary Report on Patentability for PCT Application No. PCT/EP2017/065977 dated Jan. 1, 2019, 8 pages.
International Search Report and Written Opinion for Application No. PCT/EP2016/082894, dated Feb. 17, 2017, 12 pages.
International Search Report and Written Opinion for Application No. PCT/EP2017/057204, dated Apr. 21, 2017, 9 pages.
International Search Report and Written Opinion for Application No. PCT/EP2017/057225, dated May 18, 2017, 13 pages.
International Search Report and Written Opinion for Application No. PCT/EP2018/058085, dated May 17, 2018, 19 pages.
International Search Report and Written Opinion for Application No. PCT/EP2018/064878, dated Jul. 3, 2018, 14 pages.
International Search Report and Written Opinion for PCT Application No. PCT/EP2017/065977 dated Sep. 6, 2017, 10 pages.
International Search Report for Application No. PCT/EP2018/058199, dated May 17, 2018, 18 pages.
International Search Report for Application No. PCT/EP2018/058202, dated May 2, 2018, 11 pages.
International Telecommunications Union, "G.hn Management and Diagnostics Specifications," Study Period 2009-2012, Study Group 15—Contribution 807, May 2010, 12 pages.
Kaufman, et al., "RFC 7296—Internet Key Exchange Protocol Version 2 (KIEv2)," XP055243756, Oct. 1, 2014, retrieved from the internet http://tools.ietf.org/html/rfc7296#page-58; on Dec. 26, 2018, 143 pages.
Search Report for Great Britain Application No. 1710046.2, dated Nov. 20, 2017, 4 pages.
Application and File History for U.S. Appl. No. 16/624,419, filed Dec. 19, 2019, Inventor Faus Gregori.
Farhan Siddiqui et al., "Mobility management across hybrid wireless networks: Trends and challenges," Elsevier, www.sciencedirect.com, Oct. 6, 2005, 3 pages.
GB Combined Search and Examination Report, GB Application No. GB1710043.9, dated Nov. 20, 2017, 5 pages.
GB Examination Report, GB Application No. GB1710043.9, dated Sep. 25, 2019, 2 pages.
International Search Report and Written Opinion, International Application No. PCT/EP2018/064879, dated Jul. 6, 2018, 17 pages.
3GPP "Report of SA WG2 meeting #110," SA WG2 Meeting #11020151215 Report, Jul. 6-10, 2015, 242 pages.
Communication pursuant to Article 94(3) EPC for Application No. 18728896.4, dated May 21, 2021, 8 pages.
First Office Action for Chinese Application No. 201880039944.6, dated Apr. 28, 2021, 10 pages.
Office Action For Chinese Application No. 201880041834.3, dated May 21, 2021, 13 pages.
Secretary of SA WG2 "Report of SA WG2 meeting #114," SA WG2 Meeting #11420170117 Draft Report, Apr. 11-15, 2016, 231 pages.

* cited by examiner

VOICE SERVICE HANDOVER

CROSS-REFERENCE TO RELATED APPLICATIONS

The present application is a National Phase entry of PCT Application No. PCT/EP2018/064879, filed Jun. 6, 2018, which claims priority from European Patent Application No. 17177599.2 filed Jun. 23, 2017, each of which is fully incorporated herein by reference.

TECHNICAL FIELD

The present disclosure relates to voice data communications and in particular to a method for improving the reliability of a voice service during device movement.

BACKGROUND

Long Term Evolution (LTE) is an all Internet Protocol (IP) packet switching based cellular network architecture for replacing the older Third Generation (3G) cellular networks.

Mobile network operators (MNOs) have established and maintain LTE cellular networks to provide network coverage to subscribers over a geographical area such as a country. The LTE network has a Radio Access Network (RAN) for providing wide area geographic wireless coverage to subscriber user entity (UE) devices. Wireless data exchanged between the UE and RAN are converted and carried by a wired backhaul network to an Evolved Packet Core (EPC) which provides management functions and also gateways to external networks.

The RAN is formed of a number of cellular base stations, each providing radio communication over a geographic range of several kilometers. The MNO will manage the deployment of cellular base stations so the coverage of each base station overlaps with its neighboring base stations in order to provide an optimal balance between network coverage and base station deployment.

A subscriber UE/mobile device such as a smartphone can connect to the RAN via one of the base stations. The UE is authenticated by core network entities such as the Mobility Management Entity (MME) against a user directory known as a Home Subscriber Server (HSS) and then can communicate with external networks.

Due to the coverage overlap between base stations, at any given location the mobile device will often be within range of a number of base stations forming the RAN. The UE is configured to measure the signal strength to each base station and select the base station providing the strongest cellular signal connection. Being mobile, when the mobile device changes location, a different one of the base stations in the RAN may provide a stronger signal connection. In this case the mobile device will be either moved to the new base station by the existing base station when the mobile device is active in a call using a process known as handover, or when the mobile device is idle, it may itself decide to camp on a different base station in a process known as idle mode reselection.

While base stations provide wide area geographic coverage, there will often be coverage gaps due to local interference. Furthermore in densely populated areas, a base station may be overloaded due to a high number of mobile devices.

Wi-Fi offload is a way of using non-cellular wireless networks to fill in coverage gaps and reduce cellular network load. Wireless local area networks (WLANs) generated by Access Points (APs) operating in accordance with the Institute of Electrical and Electronic Engineers (IEEE) 802.11 family of protocols known as Wi-Fi™ can be used to provide non-cellular network based wireless connectivity between mobile devices. External networks such as the Internet can be accessed via a backhaul such as a broadband link.

APs and therefore WLANs are often located in indoor locations and therefore can be used where there are cellular network coverage gaps or in densely populated areas to provide a different path for cellular network traffic into the cellular network core. This reduces the load on the RAN of cellular network base stations.

To support non RAN access paths, the EPC includes an evolved Packet Data Gateway (ePDG) for providing access to core network services and also Internet Multimedia Sub-System (IMS) services from "non-trusted" access networks.

LTE and Wi-Fi therefore provide data connectivity between a UE, cellular network services hosted in the IMS and external network resources.

The Multimedia Telephony service (MMTel) is hosted in the IMS for providing real-time multimedia communication services such as voice and real time video. With LTE, the traditional circuit switched voice services are replaced with Voice over Long Term Evolution (VoLTE). When the UE is connected to a WLAN, the UE communicates with the same IMS voice service and is known as Voice over Wi-Fi (VoWiFi) or Wi-Fi calling. VoLTE and VoWiFi are therefore two equivalent communication paths for voice data to travel from a telephony dialler application in a UE.

With the presence of the additional access path into the cellular network, the cellular network system is configured to support voice service handover from VoLTE to VoWiFi and from VoWiFi to VoLTE so that the most suitable macrocell or Wireless access point is used at any given location and time.

Typically when a UE is actively using IMS voice services, the following handovers are common:
  VoLTE to VoLTE (in the case of moving from the coverage area of a macrocell to another macrocell),
  VoLTE to VoWiFi when entering an indoor location (such as a user arriving home and connecting to their home WLAN) or
  VoWiFi to VoLTE when leaving an indoor location (such as a user leaving their home WLAN).

A fourth scenario exists: VoWiFi to VoWiFi migration whereby the UE can handover from one Wi-Fi access point to another Wi-Fi access point.

VoWiFi to VoWiFi has a higher risk of failure due to the short range of each individual access point and the movement of the mobile device. In the event of a failure to connect to the new access point, the mobile device may be unable to reconnect to the original wireless access point.

This will result in a disconnected call and following the disconnection, the mobile device will need to initiate a connection to VoLTE via a macrocell. However the extra delay will be detrimental to customer experience since a call was dropped during the failed handover.

To mitigate this problem, the typical process is to replace a direct VoWiFi to VoWiFi handover with two handovers, namely VoWiFi to VoLTE handover followed by a VoLTE to VoWiFi handover to a new access point.

Such a process is inefficient due to the overhead of the second handover but is regarded as a better solution than an unreliable handover mechanism.

SUMMARY

Aspects of the claimed disclosure are directed to this problem.

In one aspect, an embodiment of the present disclosure provides a method of managing a mobile communications device data link to a voice service accessible via a cellular data network and a wireless local area network, the mobile communications device having a cellular network interface and a wireless local area network interface, the mobile communications device being operable to establish and maintain a communications session to the voice service, the mobile communications device being connected to the voice service via a first wireless local area network access point, the method comprising: detecting when the wireless local area network interface sends requests to join a second access point; sending a request to join a cellular network, the request including an indication that the request is for a provisional link; monitoring for the establishment of a data link to the voice service via the second access point; and if the data link cannot be established, sending an further instruction to the cellular data network to complete the connection to the voice service via the cellular network; and connecting to the voice service via the cellular network.

In a further aspect, an embodiment of the present disclosure provides an apparatus for managing a data link of a mobile communications device to a cellular network voice service accessible via a cellular data network and a wireless local area network, the mobile communications device having a cellular network interface and a wireless local area network interface, the mobile communications device being operable to establish and maintain a communications session to the voice service, the mobile communications device being connected to the voice service via a first wireless local area network access point, comprising: means for detecting when the wireless local area network interface sends requests to join a second access point; means for sending a request to join a cellular network, the request including an indication that the request is for a provisional link; means for monitoring for the establishment of a data link to the voice service via the second access point; and means for sending an further instruction to the cellular data network to complete the connection to the voice service via the cellular network, if the data link cannot be established.

BRIEF DESCRIPTION OF THE DRAWINGS FIGURES

Embodiments of the present disclosure will now be described with the aid of the accompanying Figures in which.

DESCRIPTION

System Overview

Figure 1:
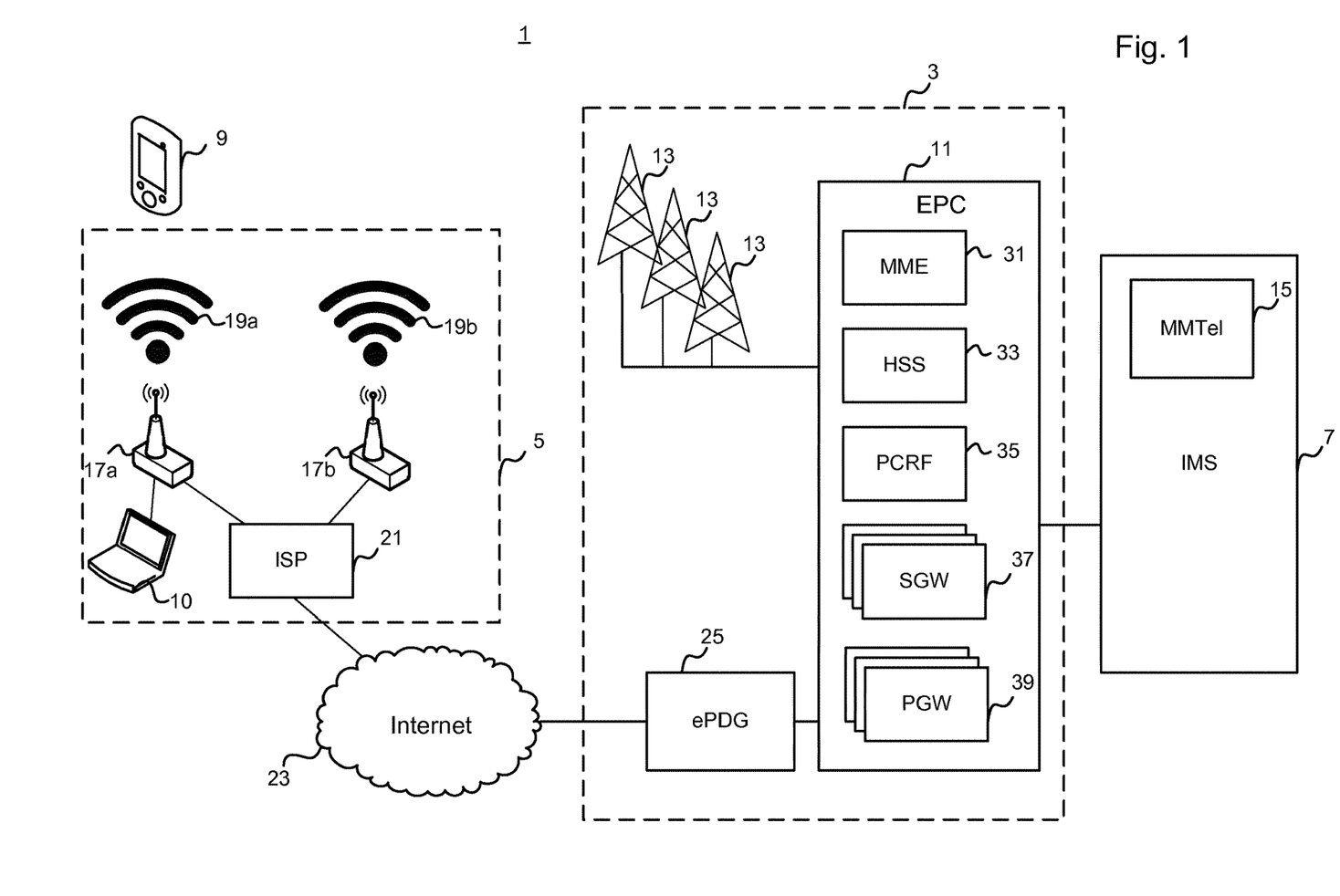
FIG. 1 schematically shows a system overview of the first embodiment.

FIG. 1 shows an overview of the main components in a telecommunications communication system 1 according to the first embodiment. The system 1 has several functional subsystems:

a Long Term Evolution (LTE) cellular network 3 infrastructure;

non-cellular network infrastructure 5 including a local network and Internet Service Provider (ISP) architecture; and an IP Multimedia Subsystem (IMS) 7.

The LTE cellular network 3 provides cellular network client/mobile devices, known as User Entities (UE) such as mobile telephones 9 with data and voice services using a packet-switched IP network. The LTE cellular network 3 includes an Evolved Packet Core (EPC) 11 and a radio access network (RAN) formed of cellular base stations known as eNodeBs 13 for connecting services and resources in the EPC 11 to the UEs 9. The EPC 11 contains control functions such as a Multimedia Mobility Entity (MME) 31, a Home Subscriber Server (HSS) 33, and a Policy Configuration Rules Function (PCRF) 35. For routing data packets into and out of the EPC 11, there are a number of Serving Gateways (SGW) 37 connected to the eNodeBs 13 and Packet Gateways (PGW) 39 connected to external resources such as the Internet 23 and the IMS 7.

The IMS 7 is an IP data network which provides a unified service architecture for all networks. Multiple services can be provided on a single control/service layer even though the access networks may be different. The IMS 7 therefore reduces the need for duplication in data services/applications. The VoLTE and VoWiFi voice calling services are hosted in an application server within the IMS 7 which in this embodiment is provided by a service known as the Multimedia Telephony Service (MMTel) 15.

The non-cellular network infrastructure 5 includes a plurality of wireless access point/modem router devices 17, each device hereinafter referred to as a hub 17, each of which is located at a user premises such as a home, shop or office. Each hub 17 generates a wireless local area network (WLAN) 19 in accordance with the IEEE 802.11 family of standards, in this embodiment 802.11ac, to allow communication between the hub 17 and the UEs 9. The routing functionality of the hub 17 also allows communication between the UE and other WLAN only devices and also wired Local Area Network (LAN) devices such as a computer 10. The routing function also provides for external network access, in this embodiment each hub 17 communicates with an Internet Service Provider (ISP) 21 via an xDSL modem (not shown) which routes data packets via a wide area network such as the Internet 23 to external servers and remote users.

In this embodiment, the hubs 17 are managed by the same administrative entity and therefore are configured in a Wi-Fi hotspot configuration whereby each hub generates a WLAN having the same service set identifier (SSID), i.e. network name and having similar wireless network configurations. Another example is a corporate Wi-Fi network providing wireless coverage throughout an office building.

The LTE cellular network 3 allows UEs 9 to access the EPC 11 services via a non-cellular network such as a WLAN 19. The LTE cellular network 3 also includes an Evolved Packet Data Gateway (ePDG) 25 which is a termination point for secure data tunnels, in this case using the IP Security (IPSec) protocol, with the UE 9 over non-trusted $3^{rd}$ Generation Partnership Project (3GPP) systems. The WLAN 19 is "non-trusted" in that it is not owned by the cellular network. The ePDG and use of data tunnels allows UE data to be routed into the EPC 11 for processing within the LTE cellular network 3 and IMS 7 network.

Behaviour of UE for Using the WLAN and LTE Interfaces

The UE 9 has both WLAN and LTE radio interfaces for accessing the non-cellular network infrastructure 5 and the LTE cellular network 3 respectively and furthermore is configured to support voice calls over VoWiFi and VoLTE respectively.

Since an eNodeB 13 of the LTE network 3 has a larger geographical coverage range than the WLANs 19, in most areas the UE will be connected to the LTE network 3 and will use the LTE network for data services including VoLTE for voice calls.

However, when the UE is within range of a WLAN 19 such as shown in FIG. 1, there is overlap in the connectivity ranges of the two different access networks, and the UE 9 can connect to data services using either the cellular interface or the WLAN interface. A typical default UE policy is that a WLAN connection is preferred. So when a UE is connected to the LTE network 3 and it detects a known WLAN 19, the UE 9 will try to use the WLAN 19 for data services, for example email, web browsing etc. In the case of more time critical applications such as VoWiFi voice services, these services would be used only if the WLAN signal quality is higher than a signal minimum strength threshold which should ensure a minimum quality of experience for the user. If the signal strength is not sufficient, then the UE may use the WLAN for data services and maintain a VoLTE link to the cellular network.

Therefore upon detection of a known WLAN 19, the UE 9 will enable its WLAN interface and provided the signal strength is sufficient, it will disable its cellular interface causing any existing cellular data services to also be disconnected. In the case of the WLAN signal strength being too low to support VoWiFi, then the LTE connection will be maintained to support only VoLTE while other data services will use the WLAN 19.

This change is generally transparent to the user of the UE as it has little impact to the operation of services such as file transfers and web browsing. Where a plurality of WLANs is available to a UE 9, the UE will measure the signal strength to each of the WLANs and typically select the strongest one for connection.

In the example shown in FIG. 1, the UE 9 has connected to WLAN 19a generated by hub 17a and a data tunnel is established via the ISP 21 to the ePDG 25 of the UE's subscribed cellular network. Since the WLAN signal strength is sufficiently high, UE 9 can establish a VoWiFi session with the MMTel 15 voice service in the IMS 7.

Figure 2:
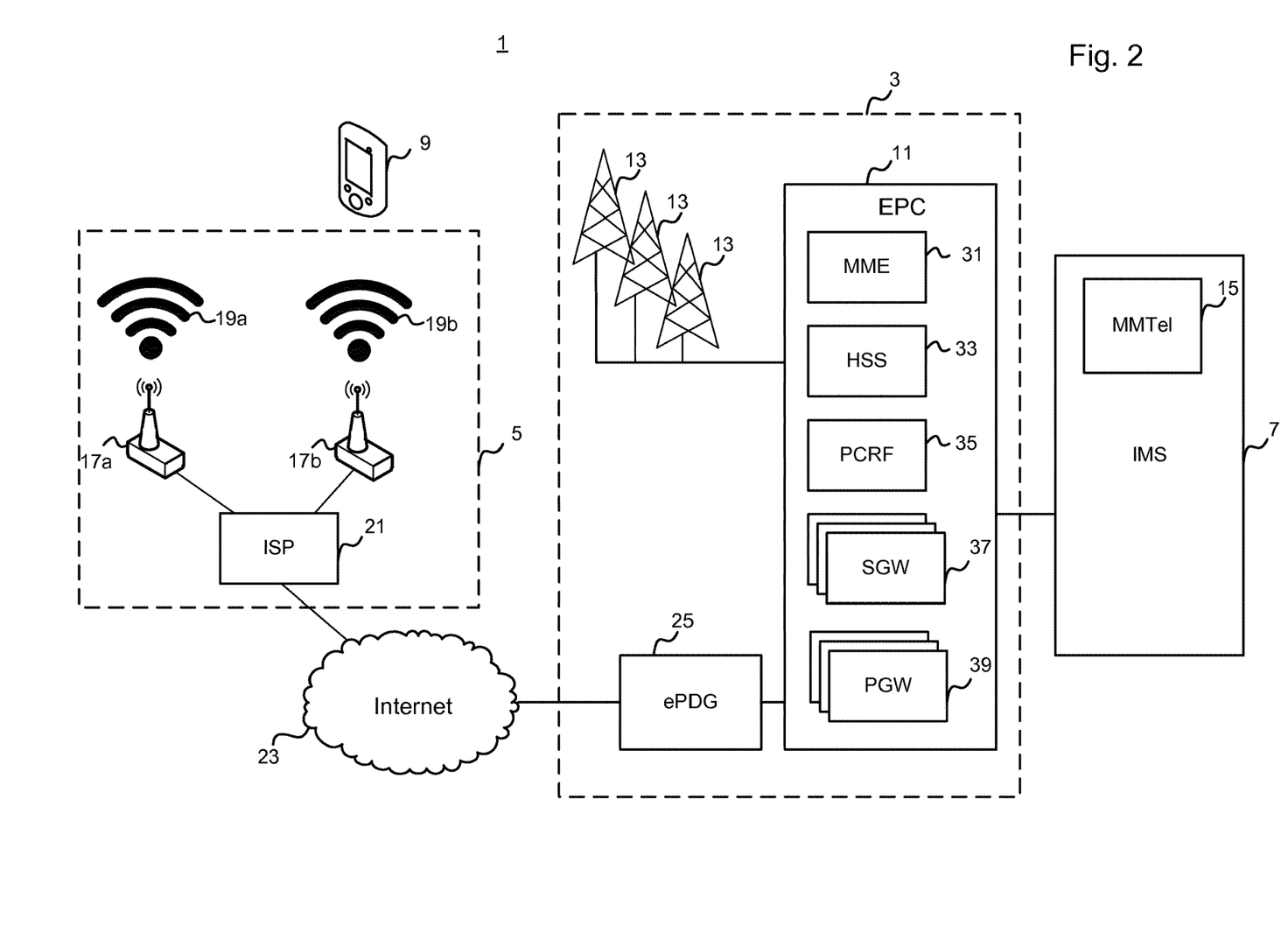
FIG. 2 schematically shows a system of FIG. 1 after the UE shown in FIG. 1 has changed location.

FIG. 2 shows the network system shown in FIG. 1 at a later point in time where the UE 9 has moved to a different location which is closer to the second WLAN 19b of the second hub 17b. Although the distances are not drawn to scale, the UE 9 can be assumed to have travelled far enough from the first hub 17a that the signal strength has deteriorated such that the signal strength to the hub 17a is much lower than the signal strength to hub 17b.

Unlike a base station 13 in a cellular network, the hub 17 in a WLAN setting is not responsible for UE movement decisions between hubs. The decision to select a new hub 17 is taken by the UE 9 itself and this movement will be referred to as roaming to differentiate this WLAN to WLAN connection behavior from the handover and idle mode reselection behavior of the UE when connected to a cellular network.

According to the standard behavior, when the signal strength to the hub 17a has dropped below a predetermined threshold, the UE 9 will send probe requests for other hubs 17 within range. When the UE determines that the signal strength to the WLAN of a second hub 17b is higher than the current connection to the WLAN of the first hub, and in some cases also above a second threshold margin, the UE will roam to the second hub 17b, involving the standard authentication (if any) and association, so that connectivity to data services of the UE can be restored via the second hub 17b.

In this embodiment the UE 9 has the necessary credentials to connect to either hub 17a,17b. The hubs 17a,17b form part of a hotspot network such that they share the same SSID and layers 2/3 connectivity configuration. In this way the hubs have different PHY and data link layer identity information, but the differences are transparent to the higher network layers of the device.

While the roaming operation may not be particularly noticeable to time insensitive applications such as file transfers and web browsing, active voice applications over VoWiFi are particularly sensitive to any disruptions that may occur during the change of hub 17.

Due to the relatively short range of Wi-Fi networks, if the UE 9 is moving quickly through the coverage area of a WLAN, it may be able to connect to the WLAN for general data access, but not be able to establish the further VoWiFi connection required for voice communications before it has left the range of WLAN 19. In a case where the UE cannot maintain a connection to the EPC 11 and IMS 7, the user experience will suffer and be manifested as a dropped call or being unable to make a new call. A WLAN 19b connection may also fail when the UE does not have the correct credentials for accessing the WLAN 17b, or when a WLAN 19b fails at the time of connection etc.

Since it is not possible to determine in advance whether the WLAN selected by the UE will be able to support VoWiFi, the conventional approach is to disable the ability for VoWiFi to VoWiFi handovers. Instead the UE can be configured so that whenever the UE switches to a different WLAN, it will perform a VoLTE connection from VoWiFi before subsequently trying to handover back to VoWiFi via the hub 17b.

However this processing incurs a large time penalty as the two handovers are established and completed.

In the first embodiment, the UE 9 will try to move directly from one hub 17a to another hub 17b to maintain a VoWiFi connection without a full intermediary VoLTE handover.

Pre-Emptive Processing

To prevent the earlier discussed issues with service breaks due to failed WLAN to WLAN roaming, the processing of the UEs 9 and EPC 11 are modified to allow a pre-emptive handover to VoLTE without committing full resources to the VoLTE handover.

The UE 9 is modified so that will attempt a direct VoWiFi to VoWiFi handover, but to prepare for the case that the roaming to hub 17b is not successful, the UE 9 and MME 31 of the EPC 11 coordinate to begin establishing a VoLTE handover with the LTE network so that if the connection to the hub 17b is not successful, the handover to VoLTE can be established more quickly.

System Components

UE Internals

Figure 3:
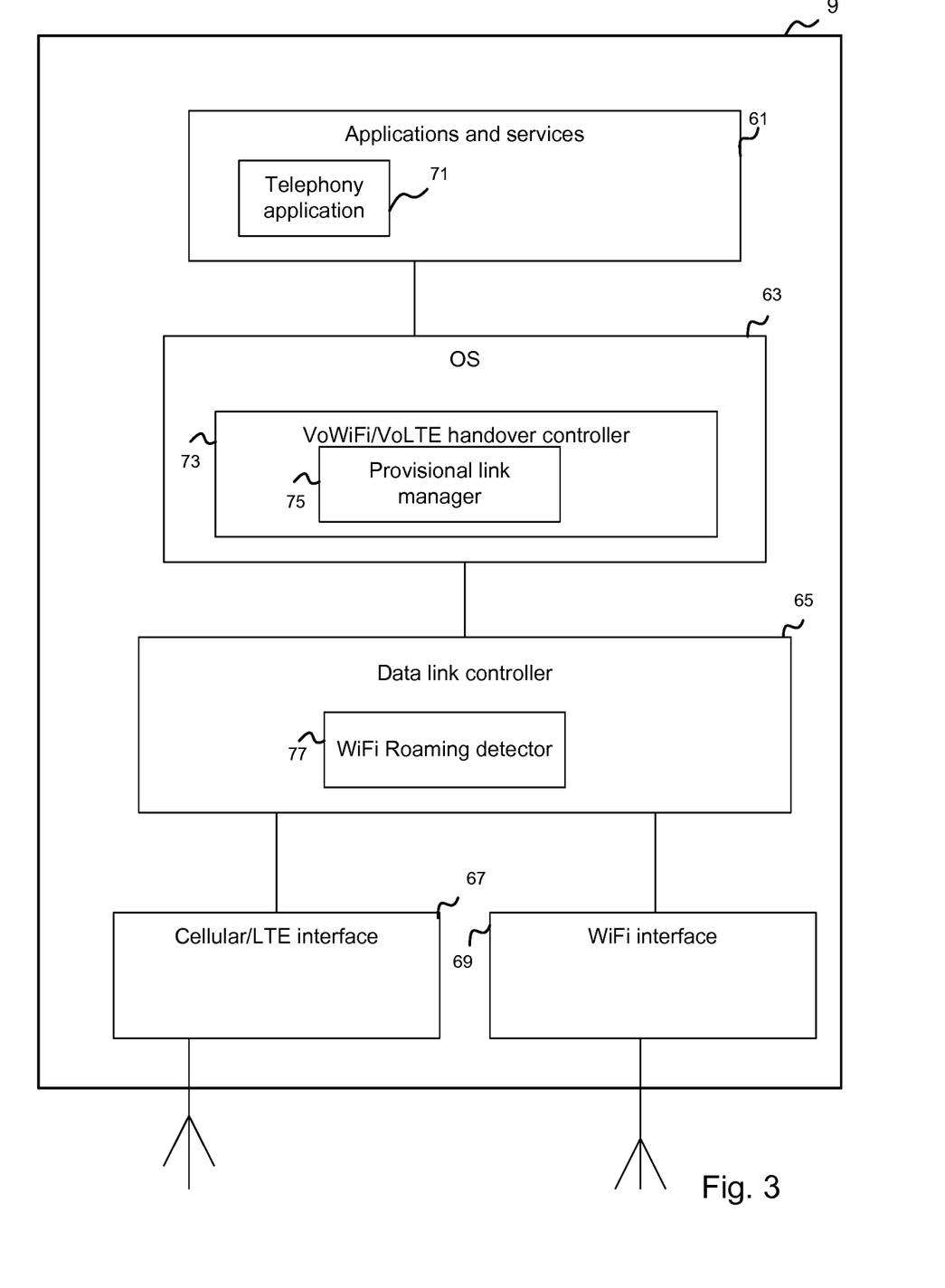
FIG. 3 schematically shows a functional component view of the UE.

FIG. 3 shows the internal components of a UE 9 in accordance with the first embodiment.

UE 9 is a mobile device such as a smartphone having a processor, persistent and working memory, LTE modem, Wi-Fi chipset, screen and input etc. (not shown).

When software instructions stored in an area of the permanent storage are executed by the processor, the UE 9 can be regarded as a set of functional components working in conjunction with the hardware elements.

As shown in FIG. 3, the UE functional components include a set of applications and services layer 61, an operating system 63, a data link controller 65, an LTE interface 67 and a Wi-Fi interface 69.

The Application and services layer 61 contains a variety of apps such as the telephony voice app 71 for enabling the user to make IMS voice calls using VoLTE or VoWiFi and other related services such as the Short Messaging Service (SMS) for sending text messages. Other apps such as VoIP calls and productivity applications which interact directly with the user would also be present in this layer.

The Operating system 63 provides the interface between the physical hardware of the UE 9 and the applications and services layer and the user. Typical UE operating systems include iOS™ and Android™. In this embodiment, the OS includes a VoWiFi/VoLTE handover controller 73 and a provisional link manager 75 which will be explained later when other components have been introduced.

The LTE interface 67 includes the antenna and transceiver hardware and also software to control the operation of the LTE hardware to allow the UE 9 to communicate with external data resources via an LTE network.

The Wi-Fi interface 69 includes a suitable antenna, transceiver hardware and software to allow the hardware to communicate with a WLAN 19.

The data link controller 65 is positioned between the Operating System and the LTE interface and the Wi-Fi interface 69 and is responsible for choosing one of the relevant interfaces for use by the UE to access data resources.

As mentioned earlier, when only Wi-Fi is available, the data link controller will ensure that the Wi-Fi interface is used to carry data traffic to external networks. When only LTE is available, the opposite will occur where the LTE link carries the traffic. In the event that both Wi-Fi and LTE are present, then typically the UE is configured to favor the Wi-Fi interface since this offloads UE data traffic from the LTE network.

Components in the First Embodiment

In the first embodiment, the UE also contains a VoWiFi/VoLTE handover controller 73 and provisional link manager 75 in the Operating System 63 and a Wi-Fi roaming detector 77 in the data link controller 65.

The Wi-Fi roaming detector 77 is responsible for monitoring the behavior of the Wi-Fi interface and detect when the UE attempts to move from an existing WLAN connection with a first hub, to a new WLAN provided by a second hub.

The Wi-Fi roaming detector 77 is placed into a ready state when the UE starts to send probe requests to determine if there are surrounding hubs since this is a sign that the signal strength to the hub 17a is deteriorating. When the UE 9 actually tries to initiate authentication and association with the hub 17b, then the VoWiFi/VoLTE handover controller 73 triggers the pre-emptive processing to mitigate an unsuccessful roaming as will be described below.

While the data link controller 65 manages whether the LTE or WLAN interface is used by the UE, the VoWiFi/VoLTE handover controller 73 is responsible for managing the voice link to the IMS. For example, this controller 73 will manage the conventional VoLTE to VoWiFi handovers and also VoWiFi to VoLTE handovers.

In the first embodiment, a LTE provisional link manager 75 forms part of the VoWiFi/VoLTE controller 73 and performs processing with regard to the VoWiFi service when the UE roams to a different access point. When this function is notified by the Wi-Fi roaming detector that the UE is roaming to a new Wi-Fi access point, the LTE provisional link manager 75 establishes a VoLTE provisional link to the IMS voice service via the cellular network as a contingency in case the roaming operation to the new WLAN is not successful for maintaining the VoWiFi service.

If the Wi-Fi roam is successful, then VoWiFi session can be recovered from the new access point and the resources that have been allocated within the EPC can be recovered. However, if the Wi-Fi roam is not successful, then the remaining steps to connect to VoLTE can be completed so that any interruption in service can be minimized.

The operation of the modified UE and MME will now be explained with reference to the following flowcharts.

Flowchart of the Operation of the UE

Figure 4:
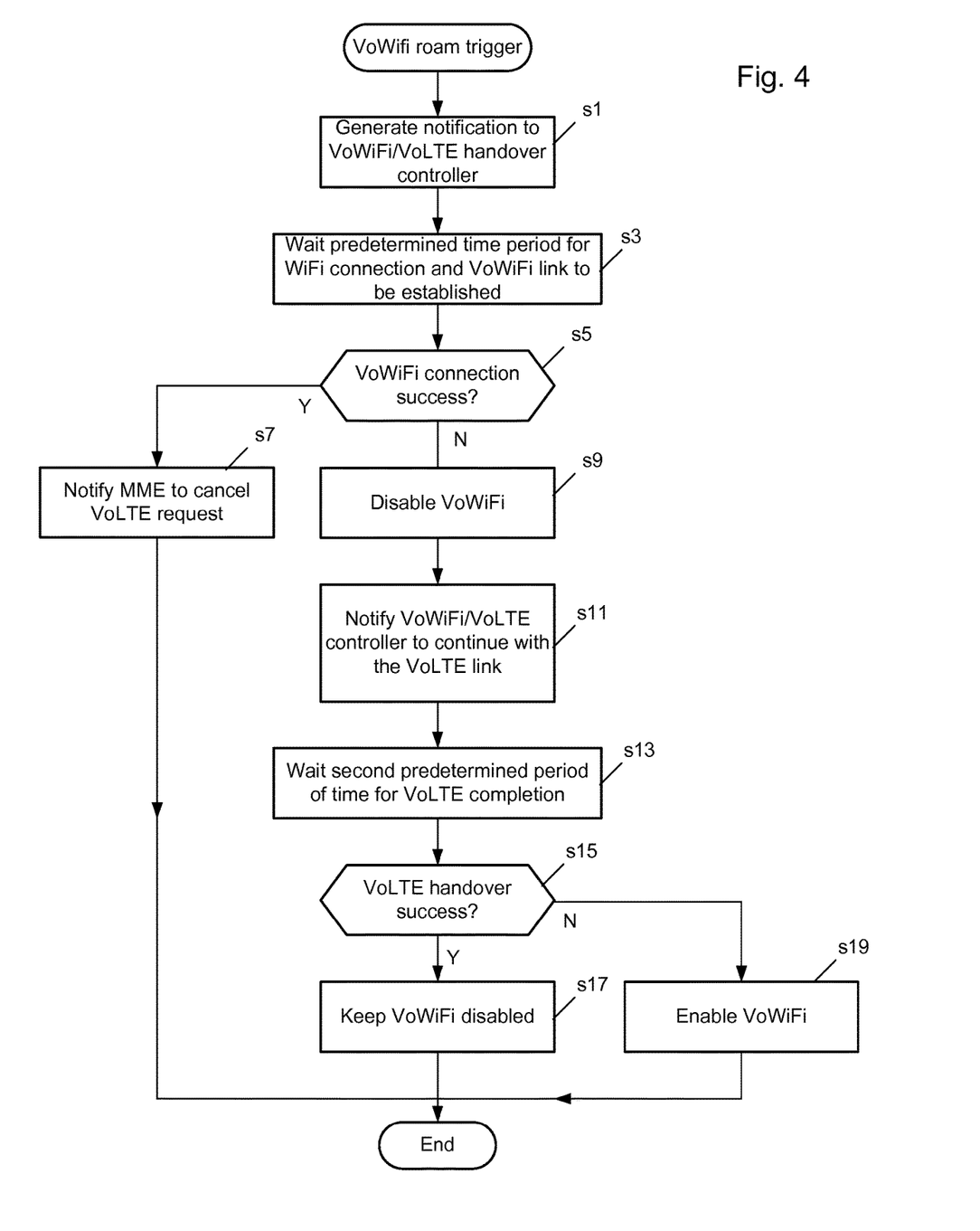
FIG. 4 is a flowchart showing the operation of the provisional link manager.

FIG. 4 shows the processing steps carried out by the provision link manager 75 when a notification is received from the Wi-Fi roaming detector 77 that a Wi-Fi access point roaming operation is taking place.

In s1, a notification is generated and sent to the VoWiFi/VoLTE handover controller 73 that a provisional request for VoLTE is required.

After notifying the VoWiFi/VoLTE handover controller 73, in s3, the provisional link manager 75 waits a predetermined period of time to allow for a VoWiFi connection to be successfully established. The standard procedure will be to first join the WLAN 17b and then establish a data link to the MMTel service 15 of the IMS.

In s5, after the predetermined period of waiting time has elapsed, the success of the VoWiFi connection is determined based on whether a notification has been received from the Wi-Fi roaming detector 77. If the VoWiFi connection is successful, then in this embodiment in s7 the VoWiFi/VoLTE handover controller 73 is notified that the provisional VoLTE connection is not required and processing ends.

However, if in s5 the VoWiFi connection was not unsuccessful, then the provisional link to enable handover to VoLTE must be utilized to avoid a voice service disconnection.

Now that the VoLTE connection is required and resources have been committed, it is preferable to avoid the situation where a late response VoWiFi success message could interfere with the initiated VoLTE handover. Therefore a way to hold off any late VoWiFi messages is required and in this embodiment, in s9 the provisional link manager 75 blocks the network port used by VoWiFi at the OS level.

In s11, the provisional link manager 75 notifies the VoLTE/VoWiFi controller 73 to continue with establishing the VoLTE link and then in s13 waits for a second predetermined period of time to allow time for the VoLTE handover to complete.

After the second predetermined period has elapsed, in s15 a test is carried out to check whether the VoLTE handover has occurred. If the VoLTE handover was successful, then in s17 the block on the network port used for VoWiFi is maintained to prevent possible flip flopping between VoLTE and VoWiFi now that a connection has been established. Then processing ends for this roaming cycle.

Conversely, if the VoLTE handover has not successfully completed, in s19 the network port used by VoWiFi is unblocked so that a connection to VoWiFi may be again attempted. However at this point there is likely to be a break in service such as a missed call. Then processing ends for this roaming cycle.

The above flowchart shows the operation of the UE 9 in response to changing location such that it will leave the range of a currently connected hub 17. The process will be repeated each time the UE 9 needs to roam to a different hub 17.

Flowchart of the Operation of the VoLTE/VoWiFi Handover Controller

Figure 5:
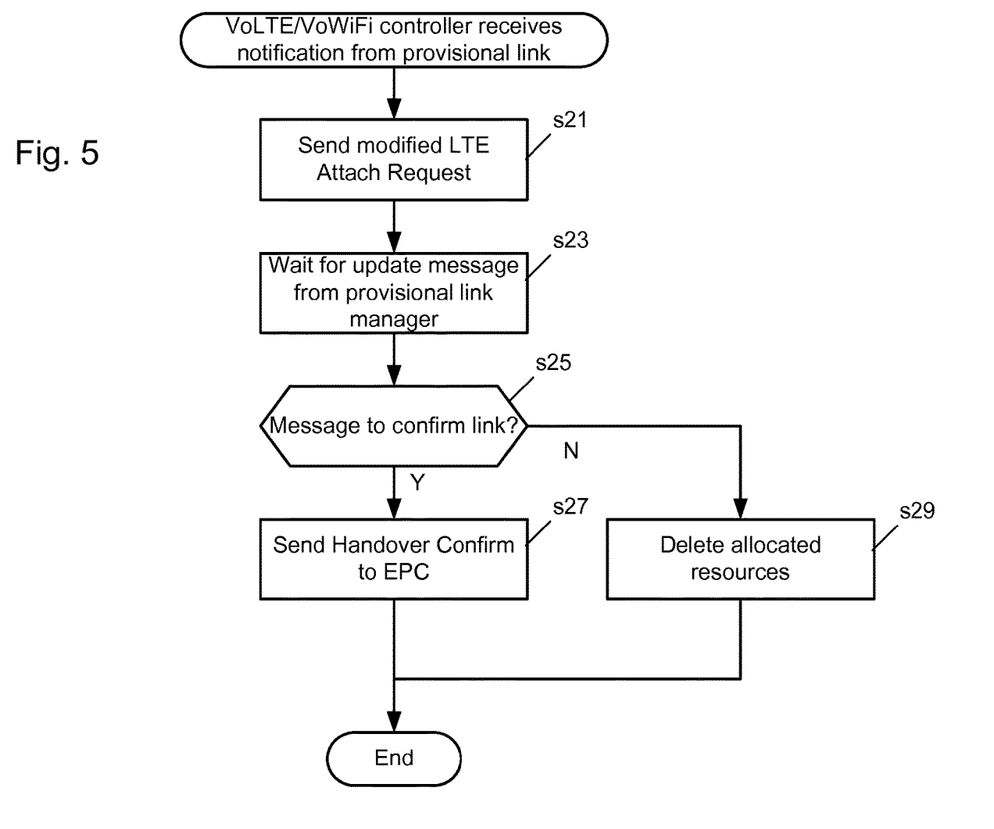
FIG. 5 is a flowchart showing the operation of the VoLTE/VoWiFi handover controller.

FIG. 5 shows the operation of the VoLTE/VoWiFi handover processor 73 in the first embodiment to implement the pre-emptive VoLTE processing when a VoWiFi to VoWiFi roam is detected.

The process begins when a notification is received from the provisional link manager 75 that a VoLTE provisional link is required. In s21, in response to the notification, the VoWiFi/VoLTE handover controller 73 initiates a connection to a base station of the cellular network and once a Radio Resource Control (RRC) cellular session has been established, the VoWiFi/VoLTE handover controller 73 sends a modified attach request to the MME 31. The modification in the attach request is the addition of a "Handover Preparation" field which can be interpreted by the MME 31.

In s23, the VoWiFi/VoLTE controller 73 waits for an update message from the provisional link manager 75 regarding the result of the VoWiFi roaming procedure as described in s7 or step s11 in FIG. 4.

After a predetermined period of time has elapsed, a message from the provisional link manager 75 should have been received and the contents of the message are analyzed in s25 to determine whether the message is to confirm the requirement for a VoLTE handover or not.

If the message is a confirmation that the VoLTE handover is required (because the VoWiFi roam operation failed), then in s27 the VoWiFi/VoLTE controller 73 sends a confirmation message to the MME 31 so that the provisional VoLTE handover prepared by the MME 31 can proceed. Processing by the VoWiFi controller ends after this step until the next time the UE is connected to VoWiFi and attempts to handover to another hub in the network.

Alternatively, if the message is a notification to cancel the VoLTE handover because the VoWiFi roam operation was successful, then the VoLTE/VoWiFi handover controller 73 will delete any allocated resources in s29 and processing ends.

Components of the MME

Figure 6:
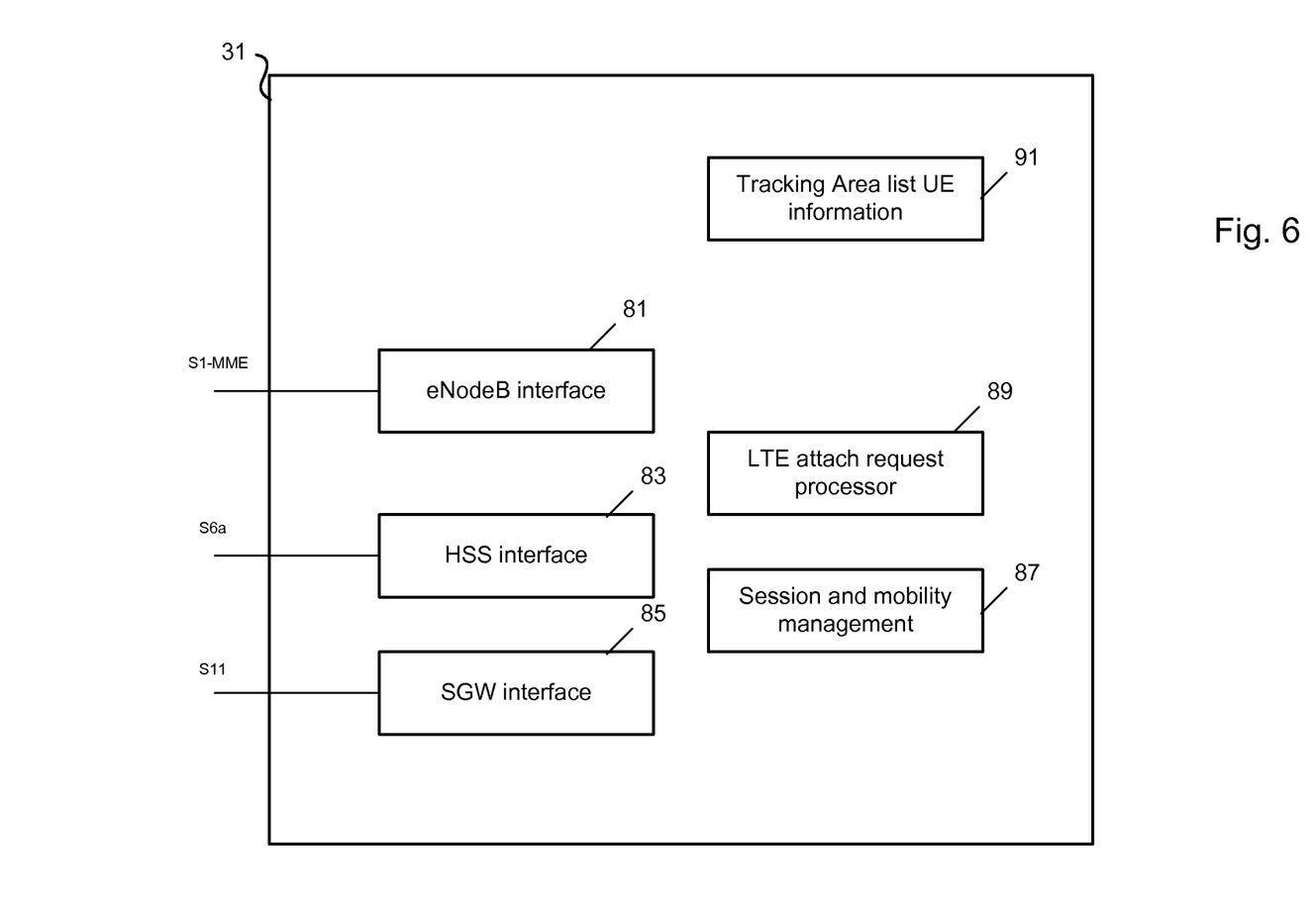
FIG. 6 schematically shows a functional block diagram of the Multimedia Mobility Entity (MME) illustrated in FIG. 1.

FIG. 6 shows the functional components of the MME in the first embodiment.

The MME 31 contains an eNodeB interface 81, a HSS interface 83, an SGW interface 85, a session and mobility management controller 87, an LTE attach request processor 89 and a Tracking Area list 91.

As is conventional, the MME 31 is an entity within the cellular EPC for managing the control plane and therefore contains a number of network interfaces for communication with other entities of the cellular network.

The eNodeB interface 81 is used by the MME 31 to communicate with any eNodeBs in the cellular network such as macrocells and small cells forming the radio access network (RAN) of the cellular network. The link between the eNodeB interface 81 and the eNodeBs forming the RAN is known as the S1-MME interface.

The HSS interface 83 is used by the MME to communicate with the HSS of the cellular network and to access subscriber information about an attaching UE. In particular, the MME accesses the HSS to obtain authentication vectors for the attaching UE. The link between the HSS interface 83 and the HSS is known as the S6a interface.

The SGW interface 85 is used by the MME to connect a UE to a one of the external networks accessible via the cellular EPC. The link between the SGW interface 83 and the SGWs is known as the S11 interface.

The MME also includes a function for session and mobility management 87 to manage UE handover to different eNodeBs in the RAN as the UE moves around the geographic coverage area and therefore needs to be connected to a different eNodeB of the cellular network RAN.

An LTE attach request processor 89 is responsible for processing new UEs which have enabled their radios and wish to connect to the cellular network. These UEs may have just been switched on, or may be leaving the range of a WLAN. As part of the handshake to join the cellular network via an eNodeB of the cellular network, the UE will send an LTE attach request to an eNodeB which in turn forwards that request to the MME. The message includes UE voice capabilities and preferences.

The LTE attach request processor 89 and the session mobility management controller 87 access a Tracking area list 91. The eNodeBs forming the RAN are grouped by geographic location, each group known as a tracking area (TA). The tracking area list 91 is used by the LTE attach request processor 89 to store the initial tracking area of the UE when it joins the cellular network.

The tracking area list 91 is used by the Session and mobility management controller 87 to record which tracking area a UE is currently in and if it changes at a boundary between tracking areas, the identity of the new associated tracking area.

The LTE attach request processor 89 and the session and mobility management controller 87 also determine a suitable SGW 37 for the UE 9 to use and communicate with SGWs 37 on the cellular network via the SGW interface 85.

The LTE attach processor 89 and the other components function in a conventional way to process UE requests to join the cellular network.

In the first embodiment, the LTE attach processor 89 contains additional processing to deal with the VoWiFi to VoWiFi roaming behaviour of the UE.

In particular, the LTE attach processor 89 is configured to determine when an incoming LTE Attach request is a provisional attach request in accordance with the above described operation of the UE in the first embodiment and to carry out a provisional process until a full handover is required.

Flowchart of the Operation of the MME

Figure 7:
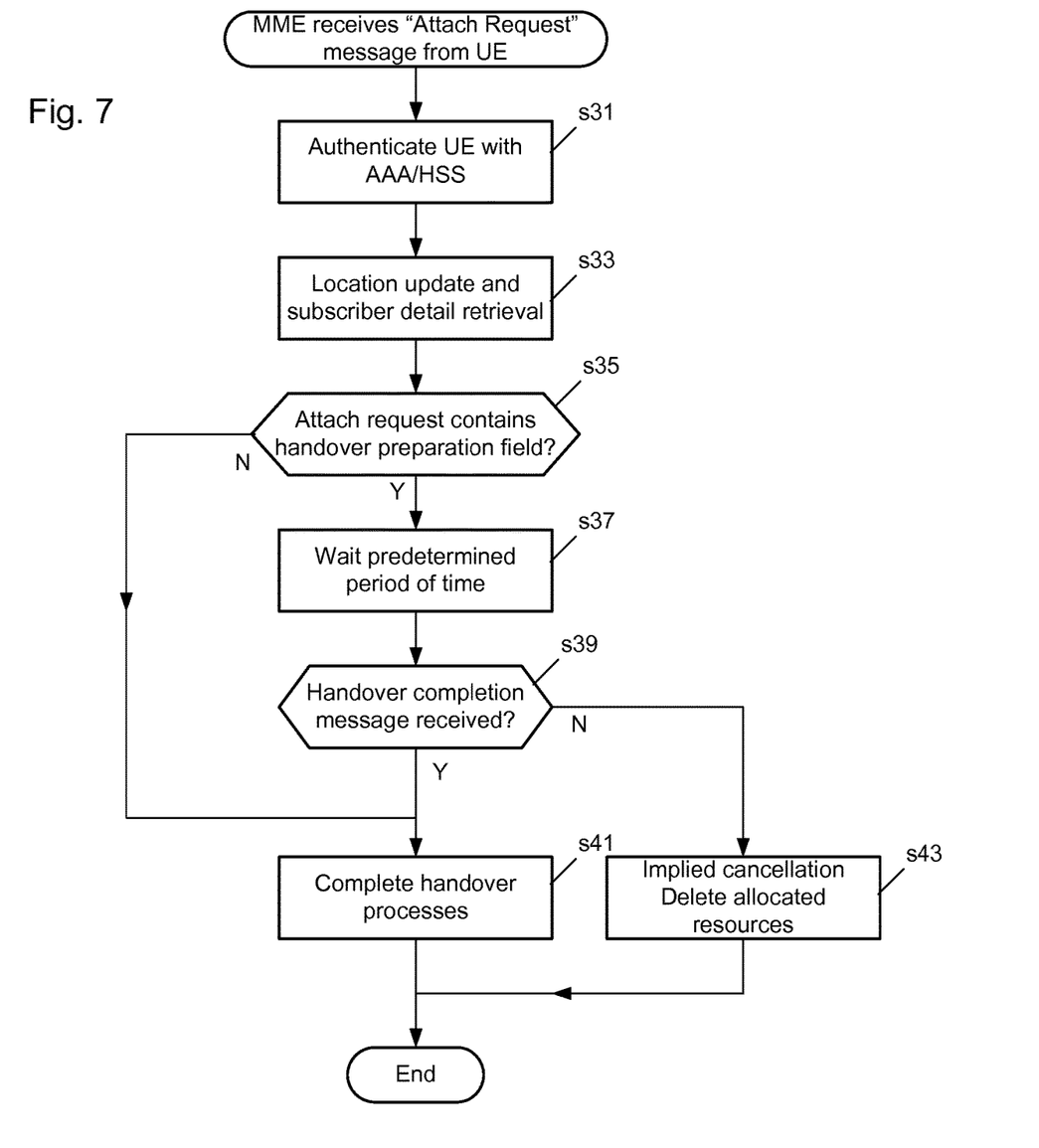
FIG. 7 is a flowchart showing the operation of the MME in the first embodiment.

FIG. 7 shows the processing of an MME in the first embodiment for VoLTE registration when a handover preparation field is present in the Attach message received from the VoWiFi/VoLTE controller 73 of the UE.

In step s31, the MME authenticates the UE with data retrieved from an authentication, authorization and accounting (AAA) server (not shown) and Home Subscriber Server (HSS) 33 to verify whether the UE is an authorized UE for the cellular network.

Assuming the UE 9 is authenticated, in s33, the MME 31 sends an Update Location message to the HSS 33 to record the new location of the UE 9.

In embodiments s31 and s33 are conventional aspects of an LTE attach request process, however in the first embodiment, the behavior of the MME 31 is modified so that in step s35 the attach request is analyzed to determine the presence of the handover preparation field indicating that a provisional VoLTE handover is required because the UE is attempting a VoWiFi to VoWiFi roaming operation and not a more conventional VoLTE to VoLTE or VoWiFi to VoLTE handover.

In s31 and s33, UE authentication and location update can be regarded as a first subset of the processing operations carried out in a VoLTE registration.

If the attach request does not contain a positive indication of the handover preparation field, then processing moves to s41 where the remaining conventional steps of a handover process are performed with respect to the SGW, PGW and IMS and processing ends.

If the Attach request does contain the handover preparation field, then in s37 the MME 31 is configured to pause the conventional handover process before significant resources have been allocated to the apparent UE handover. In this way the MME 31 is prepared to accept a VoLTE handover but has not committed to serving that UE with the establishment of bearers and IMS registration, etc.

In s37 the MME 31 waits for a predetermined period of time set at a value which enables the UE 9 to determine whether the VoWiFi handover was successful.

After the expiry of the predetermined time period, in s39 the MME 31 checks whether a handover completion message has been received. If such a message has been received, the VoWiFi roaming process was not successful and therefore the pre-emptive VoLTE link needs to be completed. In s41 the MME carries out a second subset of operations required for a VoLTE registration, to establish a VoLTE link between the UE and the IMS. In this embodiment the second subset includes:

validating the mobile device capabilities and Quality of Service (QoS) parameters;

selecting a serving gateway (SGW) and packet data gateway (PGW) and establishing a default bearer for the mobile device;

making modifications to the bearer as required; and performing an IMS registration.

After the LTE and VoLTE registration steps have been performed, processing ends.

In contrast, if in s39 a message has not been received after the time period in s35, then it is assumed that the VoLTE link is not required because the VoWiFi roaming operation was successful. In this case any resources allocated to the UE are freed and processing ends.

In the first embodiment, components of the UE and the MME interact to provide a pre-emptive solution to prevent service interruption following a failed VoWiFi roaming operation. In the event that the VoWiFi handover is successful the pre-emptive processing at the MME 31 can be reverted without wasting significant resources. However, in the event of a VoWiFi handover failure, the VoLTE backup link can be restored more quickly than a conventional process due to the time saving of the pre-emptive authentication and tracking area update.

Alternatives and Modifications

In the embodiment, the handover preparation field is part of the LTE attach message sent from the UE. In an alternative, the handover preparation field is included in the IMS attach or as a separate dedicated message.

In the embodiment, when a provisional VoLTE link has been requested and provisional link manager has determined that the VoWiFi roam has not been established in time, the provisional link manager 75 disables access to the VoWiFi network port before requesting completion of the VoLTE link. This is to prevent a late VoWiFi completion interfering with the VoLTE handover, while still allowing other applications to use the WLAN for data services.

In an alternative, the port operations at s9, s17 and s19 are not performed by the provisional link manager 75 which may be result in the UE being connected to both VoLTE and VoWiFi before the voice application chooses one of the two data links.

In a further alternative, to simplify the network interfaces, the provisional link manager is configured to cause the Wi-Fi interface to be disabled when a VoLTE link is required. This causes the UE to use the cellular network for both voice and data services.

In the embodiment, the system is described in terms of an LTE network which supports a packet based voice service. Other packet network based voice services could be used.

In the embodiment, the MME performs a pre-emptive/provisional VoLTE handover in response to an indication from the VoWiFi/VoLTE handover manager that a provisional link is required during a VoWiFi to VoWiFi roam. Once the UE has carried out an RRC connection request with a base station, the MME performs a Location Update with the HSS and receives a location update answer from the HSS. Once this step is complete, the provisional VoLTE handover is paused. The number of steps carried out at the MME in the first subset is kept to a minimum to save resources.

In an alternative, the first subset contains processing operations from the second sub-set such as determining UE capabilities. The operations in the first and second subsets can be altered in dependence of the processing capabilities of the MME and can also vary in accordance with processing load at different times of the day and/or in accordance with historic data relating to how often a full VoLTE handover is required after a provisional request.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of managing a mobile communications device data link to a voice service accessible via a cellular data network and a wireless local area network, a mobile communications device having a cellular network interface and a wireless local area network interface, the mobile communications device being operable to establish and maintain a communications session to the voice service, the mobile communications device being connected to the voice service via a first wireless local area network access point, the method comprising:
   detecting when the wireless local area network interface sends at least one probe message to attempt to join a second access point;
   sending a request to join a cellular network, the request including an indication that the request is for establishing a provisional link to a voice service accessible via the cellular network;
   monitoring for establishment of a data link to the voice service via the second access point;
   after expiry of a predetermined period of time, determining whether the data link has been established; and
   if the data link cannot be established, sending a further instruction to the cellular data network to complete the connection to the voice service via the cellular network; and
   connecting to the voice service via the cellular network.

2. The method according to claim 1, wherein the request is generated in response to an association request generated by the wireless local area network interface to the second access point.

3. The method according to claim 1, wherein the request for a provisional link includes a data field in the request which is indicative of a provisional request.

4. The method according to claim 1, further comprising blocking VoWiFi status update messages after the instruction to complete the connection to the voice service has been sent.

5. The method according to claim 1, further comprising disabling the wireless local area network interface after the instruction to complete the connection to the voice service has been sent.

6. The method according to claim 1, wherein the cellular network is a Long Term Evolution network and the voice service is accessed in accordance with Voice over LTE.

7. The method according to claim 1, wherein the wireless local area network is a Wi-Fi network and the voice service is accessed in accordance with VoWiFi.

8. An apparatus for managing a data link of a mobile communications device to a cellular network voice service accessible via a cellular data network and a wireless local area network, the mobile communications device having a cellular network interface and a wireless local area network interface, the mobile communications device being operable to establish and maintain a communications session to the voice service, the mobile communications device being connected to the voice service via a first wireless local area network access point, comprising:
   means for detecting when the wireless local area network interface sends at least one probe message to join a second access point;
   means for sending a request to join a cellular network, the request including an indication that the request is for establishing a provisional link to a voice service accessible via the cellular network;
   means for monitoring for establishment of a data link to the voice service via the second access point;
   means for determining whether the data link has been established within a predetermined period of time; and
   means for sending a further instruction to the cellular data network to complete the connection to the voice service via the cellular network, if the data link has not been established within the predetermined period of time.

9. The apparatus according to claim 8, wherein the request is generated in response to an association request generated by the wireless local area network interface to the second access point.

10. The apparatus according to claim 8, wherein the request for a provisional link includes a data field in the request which is indicative of a provisional request.

11. The apparatus according to claim 8, further comprising blocking VoWiFi status update messages after the instruction to complete the connection to the voice service has been sent.

12. The apparatus according to claim 8, further comprising disabling the wireless local area network interface after the instruction to complete the connection to the voice service has been sent.

13. The apparatus according to claim 8, wherein the cellular network is a Long Term Evolution network and the voice service is accessed in accordance with Voice over LTE.

14. The apparatus according to claim 8, wherein the wireless local area network is a Wi-Fi network and the voice service is accessed in accordance with VoWiFi.

15. A non-transitory computer-readable storage medium storing processor executable instructions which, when executed by a programmable processor, cause a mobile device to manage a mobile communications device data link to a voice service accessible via a cellular data network and a wireless local area network, a mobile communications device having a cellular network interface and a wireless local area network interface, the mobile communications device being operable to establish and maintain a communications session to the voice service, the mobile communications device being connected to the voice service via a first wireless local area network access point, the method comprising:
   detecting when the wireless local area network interface sends at least one probe message to attempt to join a second access point;

sending a request to join a cellular network, the request including an indication that the request is for establishing a provisional link to a voice service accessible via the cellular network;
monitoring for establishment of a data link to the voice service via the second access point;
after expiry of a predetermined period of time, determining whether the data link has been established; and
if the data link cannot be established, sending a further instruction to the cellular data network to complete the connection to the voice service via the cellular network; and
connecting to the voice service via the cellular network.

* * * * *